(12) United States Patent
Dominke et al.

(10) Patent No.: US 7,140,465 B2
(45) Date of Patent: Nov. 28, 2006

(54) COUPLING FOR A STEER-BY-WIRE STEERING SYSTEM

(75) Inventors: Peter Dominke, Bietigheim-Bissingen (DE); Chi-Thuan Cao, Korntal-Muenchingen (DE); Wolfgang Pfeiffer, Grossbottwar (DE); Klaus-Dieter Leimbach, Eschach (DE); Werner Harter, Illingen (DE); Jens Hafermalz, Landau-Moerzheim (DE); Helmut Knoedler, Lorch (DE); Wilfried Leutner, Schwaebisch Gmuend (DE); Juergen Schuele, Schwaebisch Gmuend (DE); Herbert Lohner, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 10/181,625

(22) PCT Filed: Nov. 16, 2001

(86) PCT No.: PCT/DE01/04261

§ 371 (c)(1),
(2), (4) Date: Oct. 28, 2002

(87) PCT Pub. No.: WO02/40336

PCT Pub. Date: May 23, 2002

(65) Prior Publication Data

US 2003/0127274 A1    Jul. 10, 2003

(30) Foreign Application Priority Data

Nov. 18, 2000 (DE) .................. 100 57 242

(51) Int. Cl.
*B62D 5/04* (2006.01)
(52) U.S. Cl. ..................................... 180/402
(58) Field of Classification Search ............... 180/402, 180/403, 443, 444, 446
See application file for complete search history.

(56) References Cited

U.S. PATENT DOCUMENTS

| | | | |
|---|---|---|---|
| 4,771,846 A * | 9/1988 | Venable et al. ............ 180/422 |
| 6,112,844 A * | 9/2000 | Bohner et al. ............. 180/403 |
| 6,138,788 A | 10/2000 | Bohner et al. |
| 6,283,243 B1 | 9/2001 | Bohner et al. |
| 6,442,462 B1 * | 8/2002 | Nishizaki et al. ............ 701/41 |
| 6,557,662 B1 * | 5/2003 | Andonian et al. .......... 180/402 |
| 6,575,263 B1 * | 6/2003 | Hjelsand et al. ........... 180/402 |
| 2001/0032749 A1 * | 10/2001 | Thomas et al. ............. 180/402 |
| 2002/0162700 A1 * | 11/2002 | Moser et al. ............... 180/443 |
| 2002/0189888 A1 * | 12/2002 | Magnus et al. ............. 180/402 |
| 2003/0141134 A1 * | 7/2003 | Sherwin et al. ............ 180/402 |
| 2003/0183440 A1 * | 10/2003 | Thomas et al. ............. 180/402 |

FOREIGN PATENT DOCUMENTS

DE   198 41 913 A 1   3/2000
DE   199 47 265 A 1   7/2000

* cited by examiner

*Primary Examiner*—Kevin Hurley
(74) *Attorney, Agent, or Firm*—Ronald E. Greigg

(57) ABSTRACT

A steer-by-wire steering system is proposed, having a steering wheel actuator and a braking device that acts on the steering column (3). The braking device is activated when the vehicle steering wheel is to be blocked or at least sharply braked, such as when the steering stop is reached or a wheel goes over the edge of a curb. The braking device functions like a switchable freewheel.

4 Claims, 6 Drawing Sheets

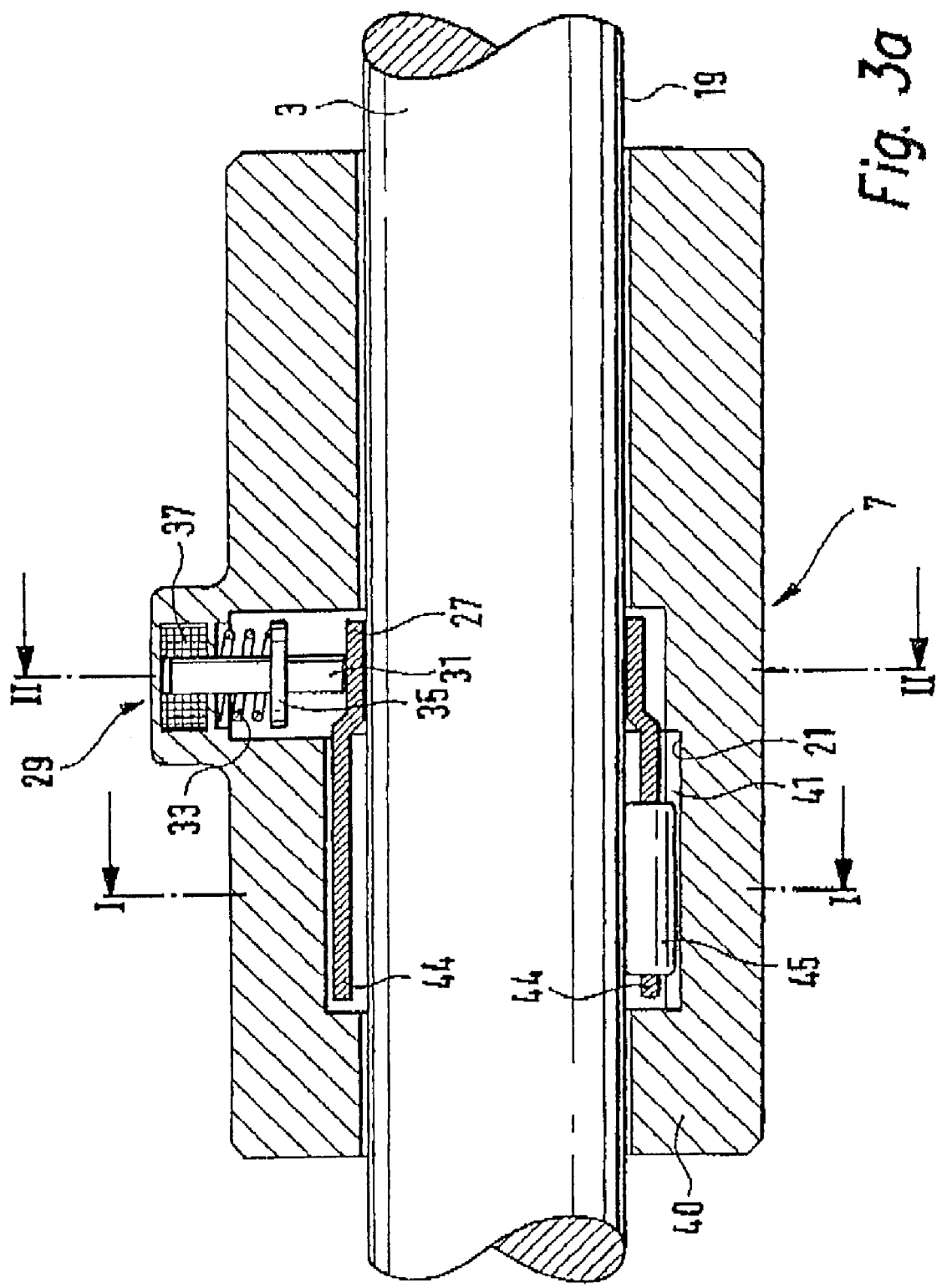

COUPLING FOR A STEER-BY-WIRE STEERING SYSTEM

CROSS-REFERENCE TO RELATED APPLICATIONS

This application is a 35 USC 371 application of PCT/DE 01/04261 filed on Nov. 16, 2001.

BACKGROUND OF THE INVENTION

1. Field of the Invention

The invention relates to a steer-by-wire steering system for a vehicle, having a manual steering device, in particular a steering wheel, connected to a steering column, and having a steering wheel actuator acting on the steering column, the steering wheel actuator having a rotor, connected to the steering column in a manner fixed against relative rotation, and a stator.

2. Description of the Prior Art

Steer-by-wire steering systems are distinguished in that in normal operation, there is no direct mechanical connection between the steering wheel and the steered wheels. Instead, the steering desired by the driver is detected via rotary angle sensors at the steering column and processed by a control unit, which transmits control signals accordingly to a steering actuator acting on the steered wheels of the vehicle.

A steering wheel actuator, via a moment, simulates the contact with the road for the driver. To that end, relatively low moment levels are required (approximately 5 Nm). For this reason, the electric motor that generates the moment can be integrated as a direct drive mechanism into the actuator, without an additional step-up gear. This makes a very good steering feel possible, with little fluctuation in moment and little noise development.

If higher moments are to be simulated for the driver, for instance by means of a steering stop or curb stop of the wheels, however, this cannot be done with that kind of electric motor without a gear. Since the steering stop, which in conventional steering systems is predetermined by the steering gear does not create any limitations to the rotary motion of the steering wheel in steer-by-wire steering systems, it is necessary to provide a separate steering stop for the steering wheel or steering column. This is necessary to prevent a flat spiral spring, for instance, in the steering column, which is required for actuating the horn, tripping an airbag, and/or actuating an automatic transmission, from being rotated excessively. If the flat spiral spring is rotated excessively, it becomes damaged. A curb stop can also be simulated by means of the rotary angle limitation of the steering column.

There are also steer-by-wire steering systems that have a so-called fallback plane. In terms of the present invention, fallback plane means a conventional mechanical connection between the steering wheel and the steering actuator that is activated if the steer-by-wire steering system fails. In the steer-by-wire mode, the mechanical connection between the steering wheel and the steering actuator is disconnected by a disengageable clutch, while for activating the fallback plane, the disengageable clutch is closed.

From German Patent Disclosure DE 43 30 658 A1, a steering wheel block for motor vehicles is known that uses clamping bodies.

The object of the invention is to furnish a steer-by-wire steering system braking device that is compact in structure, can be produced economically, and moreover has low energy consumption in the steer-by-wire mode. Moreover, the braking device should be triggerable simply and reliably.

In conjunction with the invention, the terms "clutch" and "braking device" differ in that a clutch transmits rotary motions and torques, while a braking device in the sense of the invention transmits only torque, since part of the braking device is connected to the vehicle in a manner fixed against relative rotation.

According to the invention, in a steer-by-wire steering system for a vehicle, having a manual steering device, in particular a steering wheel, connected to a steering column, and having a steering wheel actuator acting on the steering column, the steering wheel actuator having a rotor, connected to the steering column in a manner fixed against relative rotation, and a stator, this object is attained in that there is a braking device acting on the steering column; and that the braking device is actuated as a function of the torque transmitted from the stator to the steering column.

According to the invention, this object is also attained by a steer-by-wire steering system for a vehicle, having a manual steering device, in particular a steering wheel, connected to a steering column, having a clutch that couples a first portion to a second portion of a steering column, and having a steering wheel actuator acting on the steering column, the steering wheel actuator having a rotor, connected to the steering column in a manner fixed against relative rotation, and a stator, in that there is a clutch acting on the steering column; and that the clutch is actuated as a function of the torque transmitted from the stator to the steering column.

SUMMARY OF THE INVENTION

With the aid of the braking device acting on the steering column, the braking device being actuated as a function of the torque transmitted from the stator to the vehicle, it is possible in a simple way to assure that as needed, even major torques can be reported back from the steering column to the vehicle driver via the steering wheel. This can be the case for instance if the steering stop of the steer-by-wire steering system is reached, or if the vehicle with its steered wheels strikes a curb, and so forth. In all these situations, it suffices to exert a major braking moment on the steering column; there is no need for a rotary motion to be executed by the steering wheel actuator or the braking device. As a result, it is possible to dispense with the installation of a step-down gear in the steering wheel actuator, and this makes a very good steering feel with little moment fluctuation and low noise development possible.

In one embodiment of the steering system, it suffices to close the clutch, thus activating the mechanical fallback plane in order to make the steering wheel hard to move and giving the vehicle driver the feeling of a "stop", or rotary angle limitation of the steering wheel.

One embodiment of the invention provides that the clutch is a braking device in the sense of the invention. This means that the output shaft of the clutch is connected to the vehicle in a manner fixed against relative rotation.

In a variant of the invention, it is provided that the braking device includes a switchable freewheel, which in a first switching state brings about a freewheel for both directions of rotation of the steering column and in a second switching state brings about a connection in a manner fixed against relative rotation of the steering column and the vehicle for both directions of rotation; that the freewheel has an outer race, connected to the vehicle in a manner fixed against relative rotation; that the outer race is disposed concentrically to the steering column; that of the faces, facing one another, of the outer race and the steering column, a first face is embodied cylindrically, while the second face has a diameter that increases and decreases in the circumferential direction; that clamping bodies are disposed between the outer race and the steering column; and that an actuating device is present, with which the clamping bodies can be stopped or rotated relative to the second face in the circumferential direction.

By embodying the braking device as a switchable freewheel, it is attained that major braking moments can be transmitted to the steering column in the smallest possible space. Each of the clamping bodies individually engages the steering column linearly, and moreover, many clamping bodies are distributed over the circumference of the steering column, so that excessively high loads are not put on the steering column when the braking device is activated. Notch effects or the like no longer need be feared, either. Moreover, freewheels can be produced quite economically.

In a further feature of the invention, it is provided that the clamping bodies are guided in a cage; that the clamping bodies are pressed away from the first face by spring elements integrated with the cage, or by the cage itself; that the stator is supported so that it swings; that the cage and the stator are connected to one another in a manner fixed against relative rotation; that the rotor of the steering wheel actuator is connected to the first face in a manner fixed against relative rotation; and that the rotation of the stator relative to the outer race is prevented, by means of at least one spring element that acts on both the stator and the outer race, until the tripping moment is reached. In this embodiment, the steering wheel actuator is integrated with the braking device, and the torque transmitted by the steering wheel actuator to the steering column is used directly to actuate the braking device of the invention. This purely mechanical embodiment is quite sturdy and is intrinsically independent of any interference that might occur in the control unit and of the supply voltage to the on-board electrical system of the vehicle.

It has proved especially reliable if at least one spring element is braced by a first end against the stator and a stop of the outer race and by a second end against the outer race.

In an alternative embodiment, the actuating member of the actuating device can be moved in the direction of the first face by the force of a spring, and the actuating member can be actuatable in the opposite direction by the force of a lifting magnet. In this embodiment, the electric motor of the steering wheel actuator need not be integrated with the braking device but can instead engage some other location on the steering column. Since in many models of electric motor, the electrical current through the motor is proportional to the moment output by the motor, whenever a torque that the steering wheel actuator cannot bring to bear on its own is to be impressed on the steering column, it is always possible, without separately measuring the moment, to activate the actuating device by triggering the lifting magnet.

BRIEF DESCRIPTION OF THE DRAWINGS

Further advantages and features of the invention will become apparent from the description contained herein below, taken in conjunction with the drawings, in which:
Shown are.

FIG. 3a: a longitudinal section through a first exemplary embodiment of a clutch of the invention;
FIG. 3b: a cross section taken along the line I—I in FIG. 3a;
in FIG. 3a;
FIG. 4b: a cross section taken along the line II—II in FIG. 4a;
and
FIG. 4c: a cross section taken along the line I—I of FIG. 4a.

DESCRIPTION OF THE PREFERRED EMBODIMENTS

Figure 1:
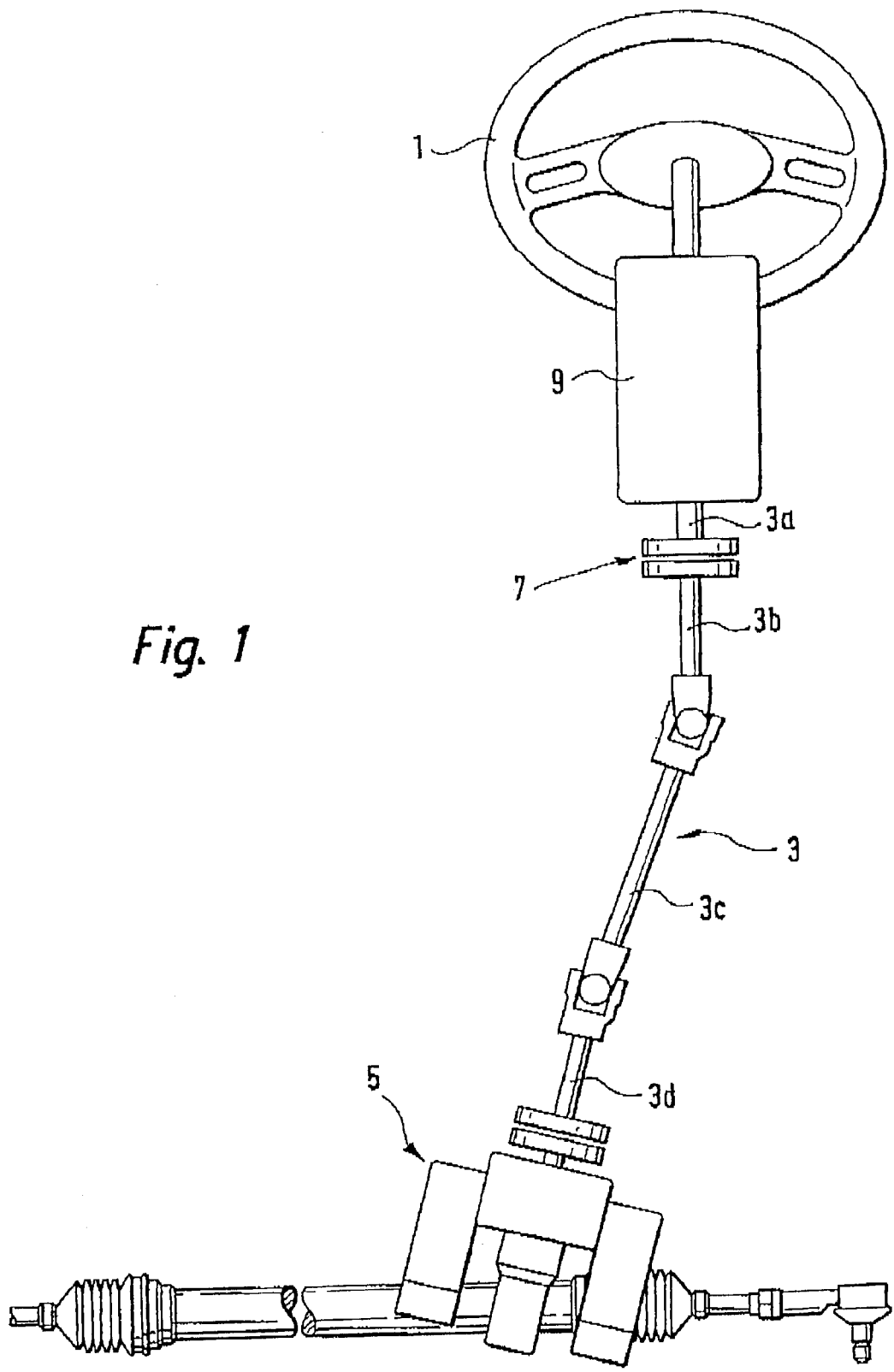
FIG. 1: a schematic illustration of a steer-by-wire steering system with a mechanical fallback plane.

In FIG. 1, a steer-by-wire steering system with a mechanical fallback plane is shown schematically. The task of every steering system is for the steering wish, expressed by turning a steering wheel 1, to be transmitted to the steered wheels of the vehicle, which are not shown in FIG. 1. In conventional mechanical, hydraulic or electrical steering systems, this transmission is done via a steering column 3, which is composed of multiple parts 3a, 3b, 3c and 3d, and a steering actuator 5, as a rule embodied as a steering gear, which converts the rotary motion of the steering column 3 into a linear motion.

In a steer-by-wire steering system, the steering column 3 is divided by a clutch 7 between the parts 3a and 3b. It is understood that the clutch 7 can also be disposed at the parts 3c or 3d.

In the steer-by-wire mode, that is, with the clutch 7 open, the driver's steering wish is picked up at the part 3a of the steering column that is connected directly to the steering wheel 1, by a steering wheel rotary angle sensor, not shown in FIG. 1, and transmitted to a control unit, also not shown. The control unit in turn triggers the steering actuator 5, which acts on the steered wheels, not shown, of the vehicle.

In the steer-by-wire mode, feedback from the roadway to the steered wheels is transmitted to the steering wheel 1 via a steering wheel actuator 9. If an error is detected in the steer-by-wire steering system, the clutch 7 is closed, and the transmission of the driver's steering wish is done from the steering wheel 1 to the steered wheels in the conventional way, via the steering column 3 and the steering actuator 5.

Figure 2:
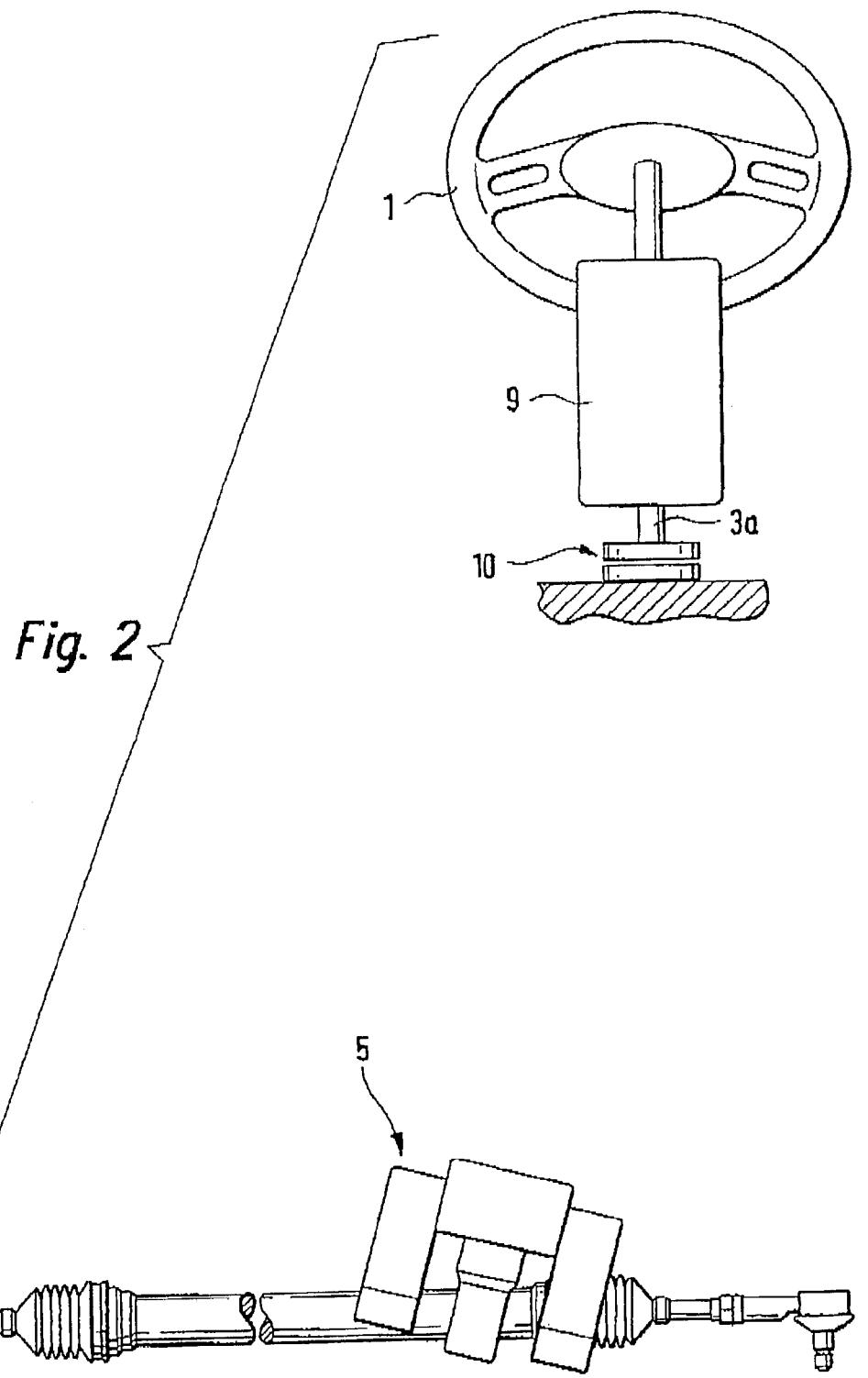
FIG. 2: a schematic illustration of a steer-by-wire steering system without a mechanical fallback plane.

In FIG. 2, a steer-by-wire steering system in which there is no mechanical fallback plane is shown schematically. In this case, the steering actuator 5 is triggered as in the steer-by-wire mode of FIG. 1.

To enable limiting the steering wheel rotary angle, a braking device 10 according to the invention is provided on one end of the steering column 3. The braking device 10 is connected to the vehicle in a manner fixed against relative rotation. The braking device 10 serves as a steering stop and serves to block the steering wheel 1. Once the steering wheel 1 has been rotated through a predetermined angle in one direction, the braking device 10 is activated and thus prevents further rotation of the steering wheel 1. The flat spiral spring, not shown in FIG. 2, in the steering column 3 is thus effectively protected against damage. The blocking of the steering wheel 1 can also be desired if the vehicle, with its steered wheels, strikes the edge of a curb and the steering wheel actuator 9 is unable to bring to bear a sufficiently major torque. The blocking of the steering wheel 1 also occurs if the vehicle is out of operation, so that the steering wheel 1 can be used by the driver as a hold on entering and leaving the vehicle. Furthermore, with the vehicle stopped, the blocking of the steering wheel 1 can also have the function of theft prevention. It is advantageous if the braking device 10 is closed in the currentless state.

The braking device 10 can be actuated as a function of the torque impressed on the steering column 3 by the steering wheel actuator 9. In some models of motor for steering wheel actuators 9, the torque output by these actuators is dependent on the current flow through the motor, so that the torque can be determined via a measurement of current.

In FIG. 3*a*, a first exemplary embodiment of a braking device 10 of the invention is shown in longitudinal section. Disposed coaxially to the steering column 3 is an outer race 40, which is connected to the vehicle, not shown, in a manner fixed against relative rotation.

The steering column 3 has a cylindrical outer face 19. Between an inner face 21 of the outer race 40 and the cylindrical outer face 19, there are clamping bodies 45. The clamping bodies 45 are fixed by a cage 44.

An actuating device 29 is disposed in the outer race 40. The actuating device 29 has an actuating member 31, which is embodied as a cylindrical pin. When the actuating member 31 is moved in the direction of the cylindrical outer face 19 of the steering column 3, it presses a portion 27 of the cage 44 against the cylindrical outer face 19 of the steering column 3, so that the cage 44 takes on the rotary motion of the steering column 3. As soon as the cage 44 is rotating relative to the outer race 40, the clamping bodies 45 are likewise rotated relative to the outer race 40, as a result of which the braking device 10 is activated.

The activation of the braking device 10 will now be explained in conjunction with FIG. 3*b*, which is a section taken along the line I—I of FIG. 3*a*.

Figure 3B:
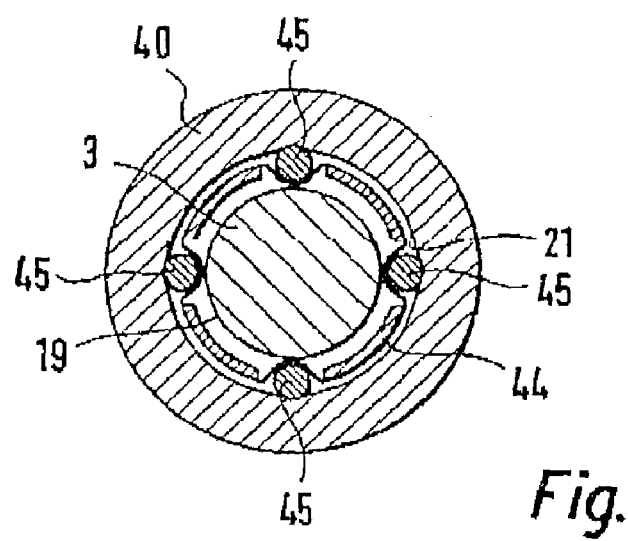

It can be seen from FIG. 3*b* that the steering column 3 has a cylindrical outer face 19, and that the inner face 21 of the outer race 40 is not designed cylindrically. Instead, the inner face 21 has different radii. In FIG. 3*b*, the clamping bodies 45 are positioned at the locations of the greatest diameter of the inner face 21. In this position, the clamping bodies 45 do not touch the outer face 19 of the steering column, and so no transmission of moments occurs between the outer race 40 and the steering column 3. The clamping bodies 45 are held in the position shown by the cage 44. Either the cage 44 itself is embodied to be so elastic that it presses the clamping bodies 45 outward, or it has spring elements (not shown), which press the clamping bodies 45 outward.

If the cage 44 is entrained by the steering column 3, as already explained in conjunction with FIG. 3*a*, then the cage 44 moves the clamping bodies 45 out of the position shown in FIG. 3*b*, and the clamping bodies 45 roll over the inner face 21 of the outer race 40 and approach the cylindrical outer face 19 of the steering column 3, until they finally touch it. As the outer race 40 and steering column 3 still continue to rotate relative to one another, the clamping bodies 45 clamp the outer race 40 and steering column 3 together. This creates a connection in a manner fixed against relative rotation between the outer race 40 and the steering column 3. In this state, which is not shown in FIG. 3*b*, the braking device 10 is activated, and the steering wheel 1 is blocked.

Since the diameter of the inner face 21 of the outer race 40 decreases symmetrically to both sides, from the locations having the greatest diameter, the braking device 10 is engaged, regardless of the direction of the relative rotation of the outer race 40 and the steering column 3, when the actuating member 31 presses the portion 27 of the cage 44 against the steering column 3. In operation of the fallback plane, a certain amount of play in the steering column 3 when the braking device 10 is activated, upon a change of direction of rotation of the steering wheel 1, is acceptable.

Figure 3C:
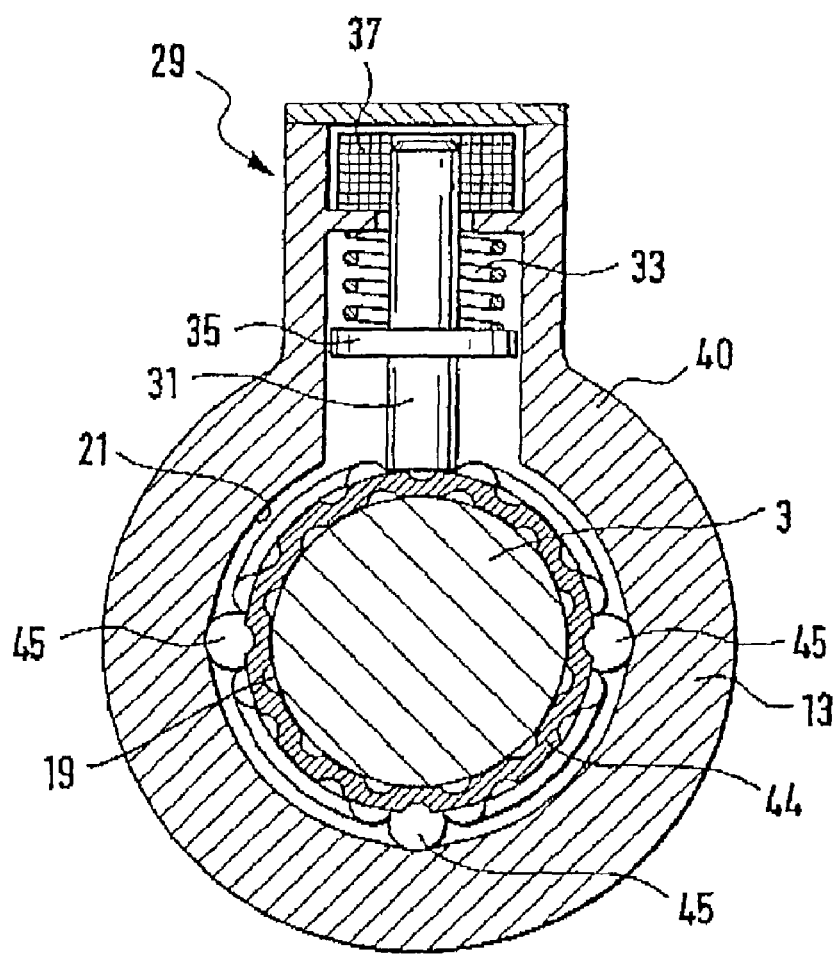
FIG. 3c: a cross section taken through a clutch of the invention along the line II—II.

The function of the actuating device 29 will now be explained in further detail in conjunction with FIG. 3*c*. Compared to FIGS. 3*a* and 3*b*, FIG. 3*c* is shown enlarged. In it, the embodiment of the inner face 21 of the outer race 40 is seen especially clearly. Because of the variable spacing between the outer face 19 of the steering column 3 and the inner face 21 of the outer race 40, clamping of the clamping bodies 45 between the steering column 3 and the outer race 40 occurs, as soon as the clamping bodies 45 move out of the positions shown in FIGS. 3*b* and 3*c*, relative to the outer race 40.

The actuating device 29 has an actuating member 31, which is pressed against the cage 44 via a spring 33. The spring 33 is braced by one end on the outer race 40 and by the other on a collar 35 of the actuating member 31. The actuating member 31 extends with its upper end into a lifting magnet 37, which is embodied as an electromagnet.

If the braking device 10 is to be opened, the lifting magnet 39 is triggered, by a control unit not shown, in such a way that it exerts a force, which is contrary to and greater in amount than, the force of the spring 33 on the actuating member 31. As a result, the actuating member 31 is lifted from the cage 44, so that the steering column 3 and outer race 40 can rotate relative to one another.

As soon as the control unit, not shown, interrupts the flow of current through the lifting magnet 37, the actuating member 31 drops onto the cage 44 as a result of the force of the spring 33 and thus brings about an activation of the braking device 10 of the invention.

The braking device 10 is always actuated whenever the steering wheel actuator 9, for instance, is unable to furnish the requisite torque, or whenever the steering wheel 1 is to be activated for other reasons. As already noted, the current flow through the electric motor of the steering wheel actuator 9 can be used to determine the torque acting on the steering column.

It is naturally also possible to design the inner face 21 of the outer race 40 cylindrically, and to provide the steering column 3 with corresponding clamping faces. This embodiment, too, since it is based only on a geometric reversal, is encompassed by the scope of present invention.

Figure 4A:
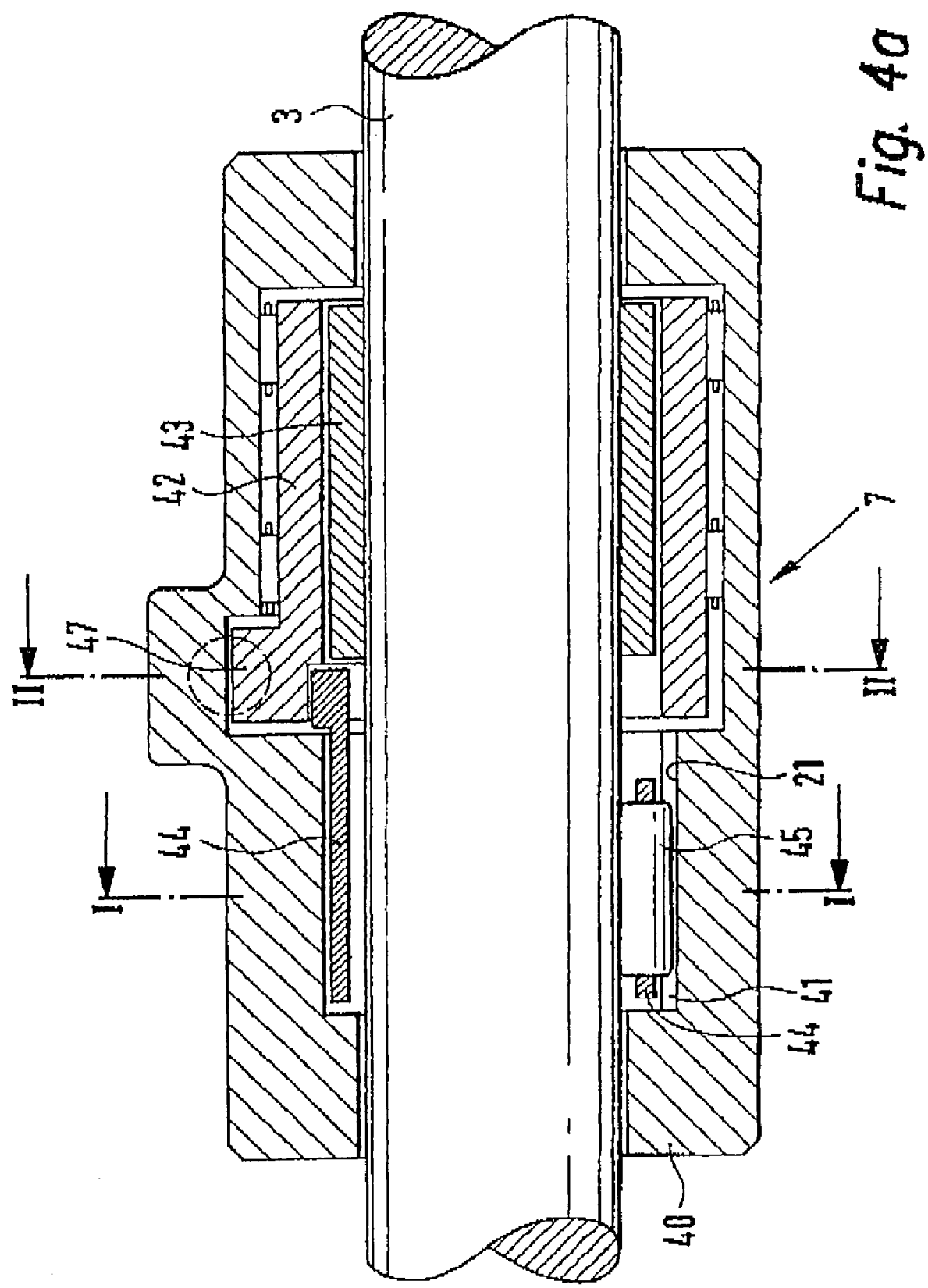
FIG. 4a: a longitudinal section through a second exemplary embodiment of a clutch of the invention.

In FIG. 4*a*, a second exemplary embodiment of a braking device 10 of the invention is shown in longitudinal section. In this exemplary embodiment again, the outer race 40 is connected to the vehicle (not shown) in a manner fixed against relative rotation. The outer race 40 has clamping faces 41. In the outer race 40, the stator 42 of the steering wheel actuator 9 is supported rotatably, for instance in swinging fashion. The rotor 43 of the electric motor is connected in a manner fixed against relative rotation to the steering column 3. The cage 44 of the clamping bodies 45 protrudes into the stator 42 and is connected to it in a manner fixed against relative rotation.

Figure 4B:
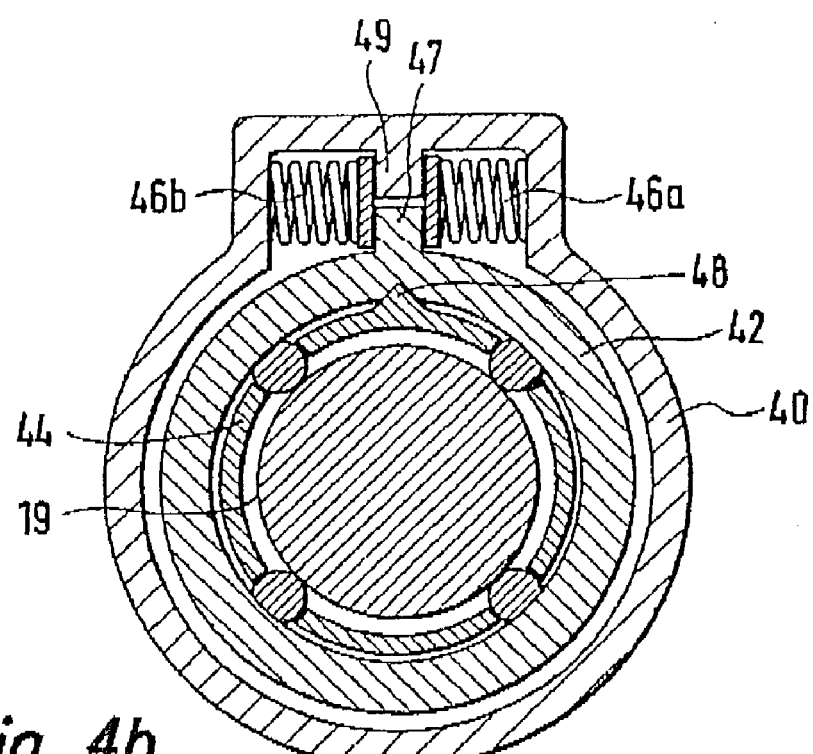

The stator 42, as can be seen from FIG. 4*b*, is fixed to the housing 40 via limit force springs 46*a* and 46*b* and a step 47. The cage 44 is in turn connected to the stator 42, for instance by means of a lug 48.

If the steering wheel actuator generates a steering moment, the reaction moment is withstood at the stator 42. If the forces resulting from the reaction moment exceed the prestressing of the limit force springs 46*a* and 46*b*, then the stator 42 moves relative to the housing 40. The limit force springs 46*a* and 46*b* are braced on one end on a protrusion 47 of the stator 42 and on a stop 49 of the outer race 40 and on the other end on the outer race 40.

Figure 4C:
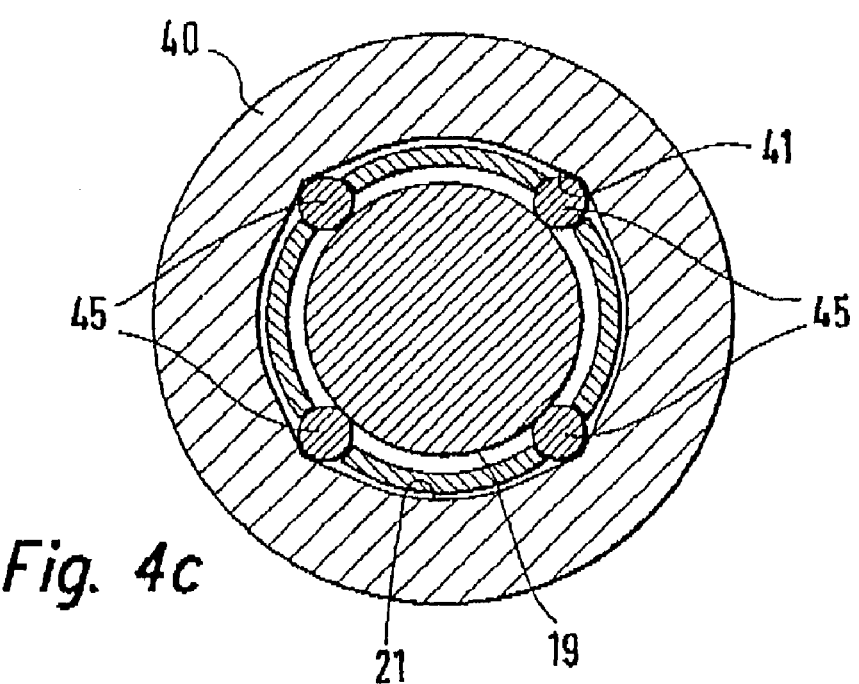

As soon as the stator 42 is in rotation, the cage 44 is rotated as well, and as can be seen from FIG. 4c, the clamping bodies 45 are shifted into the clamping position. In this exemplary embodiment, the braking device 10 is switched as a function of the moment output by the electric motor. If a steering stop is to be simulated, for instance, then the electric motor is triggered such that the forces resulting from the reaction moment overcome the prestressing of the limit force springs 46a and b, and the steering column 3 is blocked.

If the switching of the braking device 10 functioning as a rotary angle limitation is not meant to occur at a certain reaction moment, but instead to be tripped by a control unit, for instance, then the stator 42 can in that case be connected (not shown) in a manner fixed against relative rotation to the housing 40. The clamping bodies 45 are pressed resiliently into the clamping faces 41. The actuation and engagement of the clutch are effected as described for FIG. 3c.

The foregoing relates to preferred exemplary embodiments of the invention, it being understood that other variants and embodiments thereof are possible within the spirit and scope of the invention, the latter being defined by the appended claims.

| | |
|---|---|
| 1 | Steering wheel |
| 3 | Steering column |
| 3a | Portion of the steering column steering column |
| 3b | Portion of the steering column steering column |
| 5 | Steering gear |
| 7 | Clutch |
| 9 | Steering wheel actuator |
| 19 | Cylindrical outer face |
| 21 | Inner face |
| 27 | Region |
| 29 | Actuating device |
| 31 | Actuating member |
| 33 | Spring |
| 35 | Collar |
| 37 | Lifting magnet |
| 40 | Outer race |
| 41 | Clamping face |
| 42 | Stator |
| 43 | Rotor |
| 44 | Cage |
| 45 | Clamping bodies |
| 46a, b | Limit force springs |
| 47 | Protrusion |
| 48 | Lug |
| 49 | Stop |

What is claimed is:

1. A steer-by-wire steering system for a vehicle, comprising a manual steering device, in particular a steering wheel (1), connected to a steering column (3), a clutch (7) that couples a first portion (3a) to a second portion (3b) of a steering column (3), a steering wheel actuator (9) acting on the steering column (3), the steering wheel actuator (9) having a rotor (43), connected to the steering column (3) in a manner fixed against relative rotation, a stator (42), and a braking device acting on the steering column (3), the braking device being actuated as a function of the torque transmitted from the stator (42) to the steering column (3), wherein the braking device includes an actuating device (29) and an actuating member (31) of the actuating device (29) is moved in the direction of an outer face (19) of the steering column by the force of a spring (33); and wherein the actuating member (31) is actuatable in the opposite direction by the force of a lifting magnet (37).

2. A steer-by-wire steering system for a vehicle, comprising a manual steering device, in particular a steering wheel (1), connected to a steering column (3), a clutch (7) that couples a first portion (3a) to a second portion (3b) of a steering column (3), a steering wheel actuator (9) acting on the steering column (3), the steering wheel actuator (9) having a rotor (43), connected to the steering column (3) in a manner fixed against relative rotation, a stator (42), and a braking device acting on the steering column (3), the braking device being actuated as a function of the torque transmitted from the stator (42) to the steering column (3), the braking device is a clutch, wherein the braking device includes an actuating device (29) and an actuating member (31) of the actuating device (29) is moved in the direction of an outer face (19) of the steering column by the force of a spring (33); and wherein the actuating member (31) is actuatable in the opposite direction by the force of a lifting magnet (37).

3. A steer-by-wire steering system for a vehicle, comprising a manual steering device, in particular a steering wheel (1), connected to a steering column (3), a steering wheel actuator (9) acting on the steering column (3), the steering wheel actuator (9) having a rotor (43), connected to the steering column (3) in a manner fixed against relative rotation, a stator (42), and a braking device acting on the steering column (3), the braking device being actuated as a function of the torque transmitted from the stator (42) to the steering column (3), wherein the braking device includes a switchable freewheel, which in a first switching state brings about a freewheel for both directions of rotation of the steering column (3) and in a second switching state brings about a connection in a manner fixed against relative rotation of the steering column (3) and the vehicle for both directions of rotation; wherein the freewheel has an outer race (40), connected to the vehicle in a manner fixed against relative rotation; wherein the outer race (40) is disposed concentrically to the steering column (3); wherein of the faces (19, 21), facing one another, of the outer race (40) and the steering column (3), a first face (19) is embodied cylindrically, while the second face (21) has a diameter that increases and decreases in the circumferential direction; wherein clamping bodies (45) are disposed between the outer race (40) and the steering column (3); and wherein an actuating device (29, 42) is present, with which the clamping bodies (45) can be stopped or rotated relative to the second face (21) in the circumferential direction, wherein the braking device includes an actuating device (29) and an actuating member (31) of the actuating device (29) is moved in the direction of an outer face (19) of the steering column by the force of a spring (33); and wherein the actuating member (31) is actuatable in the opposite direction by the force of a lifting magnet (37).

4. The steering system of claim 1, wherein the lifting magnet is an electromagnet.

* * * * *